United States Patent
Austrell et al.

(10) Patent No.: US 9,426,711 B2
(45) Date of Patent: Aug. 23, 2016

(54) TRAFFIC CONTROL WITHIN AN IP MULTIMEDIA SUBSYSTEM

(75) Inventors: Tobias Austrell, Alvsjo (SE); Timo Forsman, Sollentuna (SE); Annika Jonsson, Enskede (SE); Jan Anders Tellinger, Hagersten (SE); Marlene Yared, Quebec (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 106 days.

(21) Appl. No.: 14/122,281

(22) PCT Filed: May 26, 2011

(86) PCT No.: PCT/EP2011/058679
§ 371 (c)(1),
(2), (4) Date: Feb. 28, 2014

(87) PCT Pub. No.: WO2012/159676
PCT Pub. Date: Nov. 29, 2012

(65) Prior Publication Data
US 2014/0192773 A1     Jul. 10, 2014

(51) Int. Cl.
*H04W 36/22* (2009.01)
*H04L 29/06* (2006.01)
*H04L 29/08* (2006.01)

(52) U.S. Cl.
CPC ........... *H04W 36/22* (2013.01); *H04L 65/1016* (2013.01); *H04L 65/1073* (2013.01); *H04L 65/80* (2013.01); *H04L 65/1046* (2013.01); *H04L 67/1002* (2013.01)

(58) Field of Classification Search
CPC ...................... H04L 65/1006; H04L 29/12188; H04L 61/1588; H04L 63/08; H04L 65/1043; H04L 65/1016; H04L 65/1073; H04L 67/1002; H04L 65/80; H04L 65/1046; H04W 36/22

See application file for complete search history.

(56) References Cited

U.S. PATENT DOCUMENTS

2008/0039081 A1* 2/2008 Ma .................... H04L 29/12188
455/433
2008/0160996 A1* 7/2008 Li ........................ H04L 65/1016
455/433

(Continued)

FOREIGN PATENT DOCUMENTS

EP     2066098 A1    6/2009
WO    2010105643 A1  9/2010

OTHER PUBLICATIONS

3GPP, "3rd Generation Partnership Project; Technical Specification Group Services and System Aspects; Feasibility Study on IMS Evoluton;(Release9)", 3GPP Draft; 23.812-115_DIFF, 3rd Generation Partnership Project (3GPP), Mobile Competence Centre; 650, Route Des Lucioles; F-06921 Sophia-Antipolis Cedex, France, vol. SA WG2, May 4, 2011, 59 pages, XP050515595.

(Continued)

*Primary Examiner* — Jung-Jen Liu
(74) *Attorney, Agent, or Firm* — Rothwell, Figg, Ernst & Manbeck, P.C.

(57) ABSTRACT

A method of handling traffic within an IP Multimedia Subsystem, IMS, network. The method comprises registering an IMS user with a first Serving Call Session Control Function, S-CSCF, of the IMS network. Subsequently, at the first S-CSCF, a decision is made or instruction received to transfer said user to an alternative, second S-CSCF within the IMS network. A notification is sent from said first S-CSCF to a further IMS node, the notification including an explicit instruction to select a second S-CSCF and, upon receipt of said notification at the further IMS node, an S-CSCF reselection initiated for the user in order to select a second S-CSCF.

19 Claims, 6 Drawing Sheets

(56) References Cited

U.S. PATENT DOCUMENTS

| | | | | |
|---|---|---|---|---|
| 2008/0239944 A1* | 10/2008 | Golla | ................. | H04L 41/0681 370/216 |
| 2009/0180378 A1* | 7/2009 | Noel | ................... | H04L 41/5009 370/230 |
| 2009/0210743 A1* | 8/2009 | Gu | ......................... | H04L 69/40 714/15 |
| 2009/0279425 A1* | 11/2009 | Du | ......................... | H04L 69/40 370/216 |
| 2009/0312003 A1* | 12/2009 | Kuhn | ................. | H04L 65/1073 455/422.1 |
| 2010/0039930 A1* | 2/2010 | Liang | ..................... | H04L 69/40 370/216 |
| 2010/0062767 A1* | 3/2010 | Leis | ........................ | H04L 69/40 455/435.1 |
| 2010/0254370 A1* | 10/2010 | Jana | .................... | H04L 65/1016 370/352 |
| 2012/0166621 A1* | 6/2012 | Sharma | ................. | H04L 41/042 709/224 |
| 2014/0115037 A1* | 4/2014 | Liu | ..................... | H04L 65/1016 709/203 |

OTHER PUBLICATIONS

Communication pursuant to Article 94(3) EPC issued in EP Application No. 11 723 916.0, dated Nov. 30, 2015, 4 pages.

* cited by examiner

TRAFFIC CONTROL WITHIN AN IP MULTIMEDIA SUBSYSTEM

CROSS-REFERENCE TO RELATED APPLICATION

This application is a 35 U.S.C. §371 National Phase Entry Application from PCT/EP2011/058679, filed May 26, 2011, and designating the United States.

FIELD OF THE INVENTION

This invention relates to traffic control within an IP Multimedia Subsystem. More particularly, the invention relates to the transfer of IP Multimedia Subsystem users between Serving Call Session Control Functions.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The Universal Mobile Telecommunications System (UMTS) is a third generation wireless system designed to provide higher data rates and enhanced services to users. The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet. It is expected that IMS will be integrated into current and future Long Term Evolution (LTE) deployments.

The IMS makes use of the Session Initiation Protocol (SIP) to set up and control calls or sessions between user terminals (or terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Figure 1:
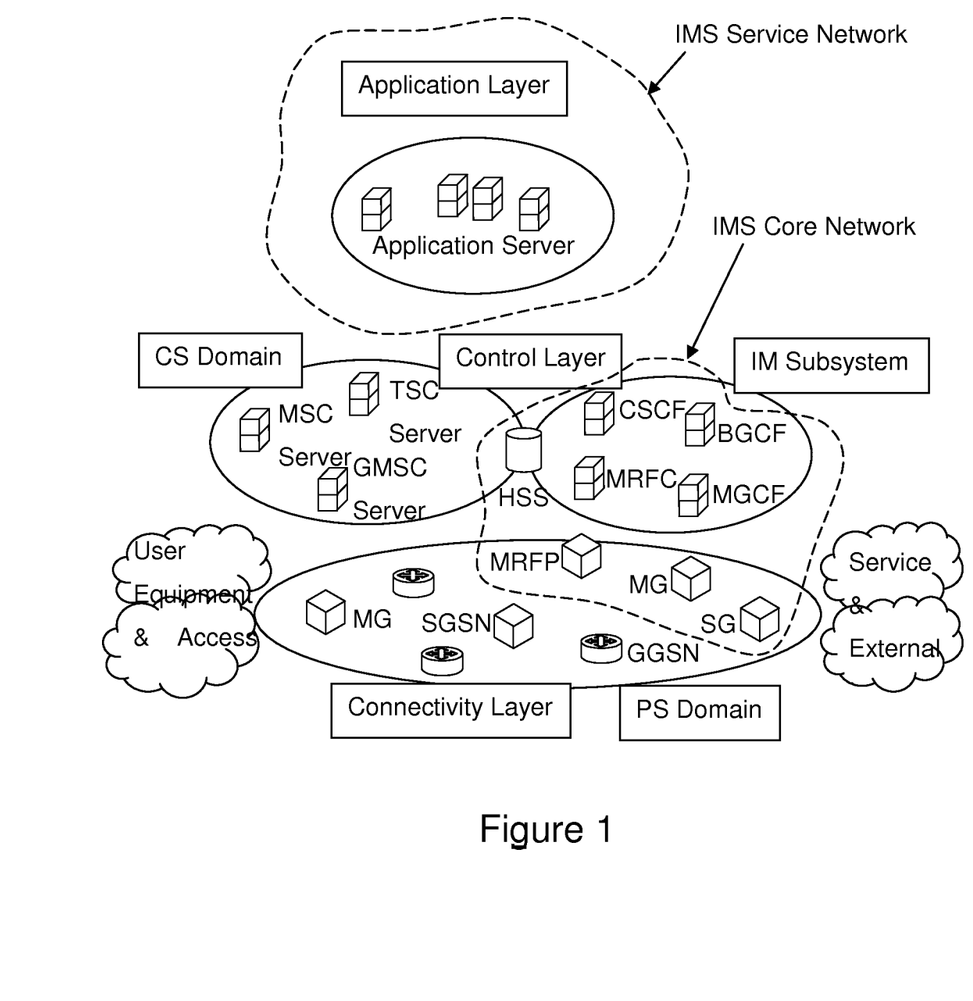
FIG. 1 illustrates schematically an IMS network integrated into a communications system comprising a 3G network.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

In the IMS architecture, failure of an S-CSCF has an impact on all users that are currently registered in this S-CSCF. The 3GPP specification "IMS Restoration Procedures on S-CSCF failure" (TS 24.229, TS 29.228 and TS 23.380) is the standard mechanism whereby, at S-CSCF failure, another S-CSCF can take over and restore the registration state of the users. The underlying principle is that, whenever a user registers with the IMS, the S-CSCF allocated to serve that user uploads registration state information (called "Restoration Info") to the HSS. If the allocated S-CSCF subsequently fails, when the user makes an originating or re-registration request it will be instructed by the IMS network to re-register whereupon the associated I-CSCF will re-select another S-CSCF and this secondary S-CSCF will download the stored Restoration Info from the HSS, restore the state of the user, and start handling the user. In the case where the user registered with the failed S-CSCF is the terminating user for an incoming request, the request will be handled by an alternative S-CSCF. The associated I-CSCF will reselect another S-CSCF and this secondary S-CSCF will download the stored Restoration Info from the HSS, restore the state of the user, and start handling the user.

IMS Restoration Procedures can be used in cases other than S-CSCF failures. For example, consider the case where an operator wants to reduce the load on a certain S-CSCF because of planned maintenance or upgrade to the S-CSCF, or because of problems observed in the S-CSCF (to address an identified problem an operator might want to enable a processor intensive tracing process). To perform these operations, the S-CSCF can trigger a "drain-out" of users from itself, causing these users to be moved to another S-CSCF. This drain out is achieved by triggering the IMS Restoration Procedure in a controlled way.

Within the IMS, situations can occur in which traffic becomes unevenly distributed among the CSCF nodes. This occurs in particular when a node is deliberately taken out of use for maintenance purposes or due to failure. When a CSCF node becomes non-operational or is otherwise unreachable, all IMS traffic is redirected and handled by the remaining operational CSCF nodes. In the case of a failed S-CSCF, the re-allocated, alternative S-CSCF will allocated to the transferred IMS users for the remainder of their registration life cycles (assuming no subsequent failure of the alternative S-CSCF). When the previously non-operational S-CSCF becomes operational again, the traffic distribution among the S-CSCF pool will most likely be unevenly distributed. The S-CSCF re-entering service will have very little traffic compared to the traffic levels of the other S-CSCFs in the pool. Of course, over a period of time, as IMS users de-register and then initiate new initial register procedures, the traffic may become more evenly distributed.

Having an uneven distribution of traffic amongst S-CSCF nodes, even temporarily, is wasteful in terms of IMS network resources. In the absence of an alternative solution, network operators must engineer spare capacity within their networks in anticipation of an uneven traffic distribution.

The IMS Restoration Procedures discussed above is not well suited to the dynamic redistribution of traffic within the IMS as it is intended to deal primarily with S-CSCF failures and the like. Moreover, it results in service problems for affected users, e.g. the dropping of a call involving a user when that user is transferred to another S-CSCF.

SUMMARY

It is an object of the present invention to enable IMS users to be moved smoothly, and with minor or no service interruption, from one S-CSCF node to another S-CSCF node.

According to a first aspect of the present invention there is provided a method of handling traffic within an IP Multimedia Subsystem, IMS, network. The method comprises registering an IMS user with a first Serving Call Session Control Function, S-CSCF, of the IMS network. Subsequently, at the first S-CSCF, a decision is made or instruction received to transfer said user to an alternative, second S-CSCF within the IMS network. A notification is sent from said first S-CSCF to a further IMS node, the notification including an explicit instruction to select a second S-CSCF and, upon receipt of said notification at the further IMS node, an S-CSCF reselection initiated for the user in order to select a second S-CSCF.

According to a second aspect of the present invention there is provided an apparatus configured to operate as a Serving Call Session Control Function, S-CSCF, within an IMS network. The apparatus comprises a user registration controller for registering users of the IMS network to allow the provision of IMS services to the registered users, and a user transfer controller for making a decision or receiving an instruction to transfer a registered user to an alternative S-CSCF within the IMS network. The apparatus further comprises a transfer notifier, responsive to a decision or instruction to transfer a registered user, for sending a notification to a further IMS node, the notification including an explicit instruction to select an alternative S-CSCF.

According to a third aspect of the present invention there is provided a Call Session Control Function, CSCF, within an IMS network. The apparatus comprises a receiver for receiving from a first Serving Call Session Control Function, S-CSCF, with which an IMS user is currently registered, a notification including an explicit instruction to select an alternative, second S-CSCF, and a registration initiation entity for sending a registration initiation request to a further IMS node, this request also including an explicit instruction to select an alternative second S-CSCF.

According to a fourth aspect of the present invention there is provided apparatus configured to operate as an Application Server within an IMS network. The apparatus comprises a receiver for receiving from a first Serving Call Session Control Function, S-CSCF, with which an IMS user is currently registered, a notification including an explicit instruction to select an alternative, second S-CSCF, and a response unit for responding to receipt of said explicit instruction by sending a SIP traffic initiation request in respect of said user to an I-CSCF.

DETAILED DESCRIPTION

It will be appreciated from the above discussion that the existing IMS Restoration Procedures on S-CSCF failure mechanism does not facilitate the dynamic and smooth transfer of IMS users between Serving Call Session Control Functions (S-CSCFs) within an IMS network. In order to provide a more appropriate solution, it is proposed here to enable an S-CSCF to send an explicit transfer instruction to another IMS node such as a P-CSCF or I-CSCF in order to cause that other IMS node to perform an S-CSCF reselection. This approach may be implemented in a number of different ways, three of which will now be discussed.

Reg-Event Based Approach

When a user has been registered in an IMS network it is possible for a node to subscribe to the user's state in order to receive notifications when the user's state is for some reason changed or removed. This mechanism can be used both from the registered terminal and from other node entities within the IMS network and is called "Event Package for Registrations" (RFC 3680, TS 24.229). The "Event Package for Registrations" is referred to below as Reg-Event.

Figure 2:
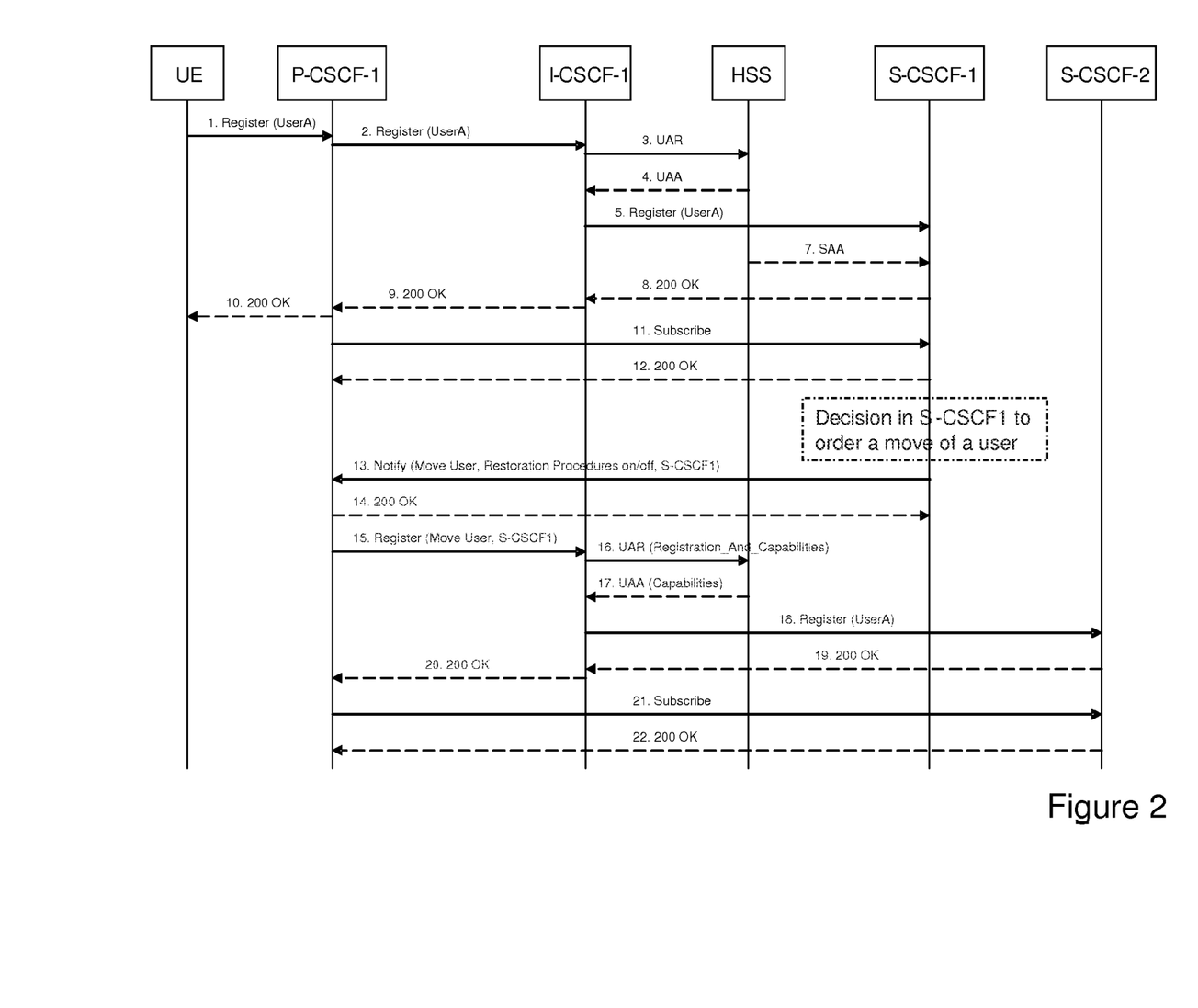
FIG. 2 shows signalling associated with a first procedure for moving an IMS user from a first to a second S-CSCF.

FIG. 2 illustrates a signalling flow associated with moving a user (User Equipment, UE) from a first S-CSCF (S-CSCF-1) to a second S-CSCF (S-CSCF-2) using the Reg-Event procedure defined in 3GPP TS 24.229. Steps 1 to 10 are standard procedures associated with IMS registration including S-CSCF allocation. Steps 11 and 12 are also standard procedures but are a pre-requisite to be able to move a user from one S-CSCF to another S-CSCF using the procedure described here. Steps 11 and 12 result in the Proxy Call Session Control Function (P-CSCF) being subscribed to the user's registration status at the allocated S-CSCF, namely S-CSCF-1.

When the S-CSCF-1 determines that the registered user UE should be moved from itself to S-CSCF-2, S-CSCF-1 sends a Notify request, step 13, to the P-CSCF that is currently holding registration state for the particular user. S-CSCF-1 keeps the current registration state until a new S-CSCF is assigned, whereupon S-CSCF-1 is informed of the reallocation through an existing procedure (involving the HSS sending a Cx RTR to S-CSCF-1 requesting removal of the user's state).

The Notify request is constructed and sent according to standard mechanisms (3GPP TS 24.229 and RFC 3680), but contains the following new information:

An explicit request to move the user's registration state, i.e. to initiate a registration procedure on behalf of the user.

An indication of whether Restoration Procedures is turned on or off in the IMS system.

The S-CSCF Server Name currently serving the user, in this case S-CSCF-1.

[The information associated with the two last bullet points can be used to optimise the transfer procedure as discussed further below.]

The new information elements may take the following form:

```
<?xml version="1.0"?>
   <redirectinfo xmlns="urn:ietf:params:xml:ns:redirectinfo"
       xmlns:xsi="http://www.w3.org/2001/XMLSchema-instance"
           version="0">
       <redirectuser aor="sip:user@example.com">
       <restorationprocedures="true">
       </restorationprocedures>
       <servingcscf ="scscf.example.com">
       </servingcscf>
       </redirectuser>
   </redirectinfo>
```

The P-CSCF acknowledges receipt of the Notify by returning a 200 OK to S-CSCF-1 (step 14). The P-CSCF then takes the role of a Terminal Agent (TA) and initiates the Registration Procedure for the UE (steps 15 to 20). The P-CSCF keeps the current registration state until the new state has been established (i.e. a successful response is received from a new S-CSCF). If there is no new S-CSCF available, the registration state remains in S-CSCF-1. S-CSCF-1 might at a later stage again request to move the user in case a new S-CSCF is then available.

The P-CSCF includes in the Register request (step 15) the information received in the Notify request, in order to inform the I-CSCF that the I-CSCF shall perform a reselection and also to identity the S-CSCF that triggered the transfer procedure. A knowledge of the identity of S-CSCF-2 should ensure that the I-CSCF does not try to move the user to the already assigned S-CSCF, i.e. S-CSCF-1. The P-CSCF can choose to register multiple user contacts if these exist.

When the I-CSCF receives a registration request with the "Move User" and the "S-CSCF Server Name" parameters, it immediately sends a User Authorisation Request (UAR) to the user's Home Subscriber Server (HSS), step 16, asking for "capabilities" to enable the I-CSCF to select an S-CSCF (from a Resource Broker which contains the identities of all available S-CSCFs and their respective capabilities). The capabilities are returned by the HSS in a User Authorisation Answer (UAA) response, step 17. The I-CSCF excludes the server name (S-CSCF-1) received in the Register request when selecting an S-CSCF from the pre-configured list of S-CSCF nodes.

An alternative mechanism to prevent reselection of the same S-CSCF by the I-CSCF would be for the I-CSCF to itself extract the already used server name from the HSS by sending a UAR to the HSS explicitly requesting this name and, after receiving the server name in the UAA response, to cache the name and send a further UAR to the HSS asking for capabilities.

Once the I-CSCF has completed the selection of a new S-CSCF, in this example S-CSCF-2, the I-CSCF sends a Register request to S-CSCF-2 in respect of the user, step 18. If registration is successful and the user restored based upon information in the HSS previously uploaded by S-CSCF-1, S-CSCF-2 returns a 200 OK to the I-CSCF, step 19. A 200 OK response is also returned by the I-CSCF to the P-CSCF. As already discussed above, at this stage the previous S-CSCF-1 may be informed of the successful transfer, allowing S-CSCF-2 to remove state information for the user.

The P-CSCF subscribes to the user's registration status at S-CSCF-2 at steps 21 and 22. This prepares the system for any subsequent transfer of the user.

In order to give rise to as little service interruption as possible for the end user, it is preferable to provide support for and enable Restoration Procedures. It would still be possible to move a user from one S-CSCF to another S-CSCF with the current proposal in the absence of support for or enablement of Restoration Procedures, although service interruption might be greater.

A user may have contacts (i.e. IP addresses) registered in multiple P-CSCF nodes at the same time. The user profile will not be completely recreated in the new S-CSCF until all P-CSCFs have triggered a registration for all contacts for the user. This requires that a Notify be sent by the old S-CSCF (S-CSCF-1) to all P-CSCFs holding the registration state. If Restoration Procedures is supported, the new S-CSCF can recreate all contacts immediately on the registration from the first P-CSCF initiating the registration procedure.

Sending Unsolicited Notification Request

A second, alternative approach to handling the transfer of users between S-CSCF nodes involves a currently allocated S-CSCF sending a notification to the P-CSCF using the Path header stored in the S-CSCF. The notification includes the Contact requesting the P-CSCF to initiate the registration procedure on behalf of the registered user. When the P-CSCF receives the request to initiate the registration procedure, the P-CSCF takes the role of a TA and creates a registration request that is sent to an I-CSCF according to already existing registration procedures. The I-CSCF selects a new S-CSCF which in turn restores the user based on information in the HSS previously uploaded by the previous S-CSCF.

As with the Reg-Event based approach, it is preferable although not essential to support and enable Restoration Procedures in order to minimise end user service disruption. In the case of a user having contacts registered in multiple different P-CSCFs, the first S-CSCF sends a Notify to each of these P-CSCFs.

An advantage of the second approach is that it can be employed in networks that do not support Reg-Event. On the other hand, a possible disadvantage is that it might make it possible for any entity to force a move of the user as the P-CSCF cannot know if the unsolicited request comes from the currently allocated S-CSCF or from any other node in the IMS network or even from a terminal (inter-node IMS network signalling is not authenticated).

Transfer Triggered on Non-Register Requests

Certain networks may not support Reg-Event or may have it disabled (for example to reduce network signalling). In addition to moving a user during the registration procedure, it is also today possible to move a user by having the S-CSCF return a 480 error response to the I-CSCF, triggering a reselection of another S-CSCF. However, some networks implement 24 hours registration timers which means that it can take up to 12 hours before a user is moved.

A new mechanism is proposed here to inform other IMS nodes such as an I-CSCF or an Application Server (AS) to select a different S-CSCF. This mechanism involves extending the 3GPP IM CN subsystem XML body. This XML body can be inserted in any SIP message exchanged within a 3GPP network. Any SIP User Agent or proxy may insert or remove the 3GPP IM CN subsystem XML body or parts of it, as required, in any SIP message. [The 3GPP IM CN subsystem XML body shall not be forwarded outside a 3GPP network.]

Considering the approach in more detail, a user is moved when the currently allocated S-CSCF receives a SIP request, other than a Register request, i.e. a non-Register request, in respect of that user. The allocated S-CSCF triggers the transfer by responding to the I-CSCF with a negative response. Upon receipt of the negative response, the I-CSCF reselects an alternative S-CSCF which restores the user's profile from the HSS. For this alternative approach to work, it is necessary that Restoration Procedures is enabled in the IMS network, otherwise it will not be possible to restore the user in the new S-CSCF selected by the I-CSCF.

Figure 3:
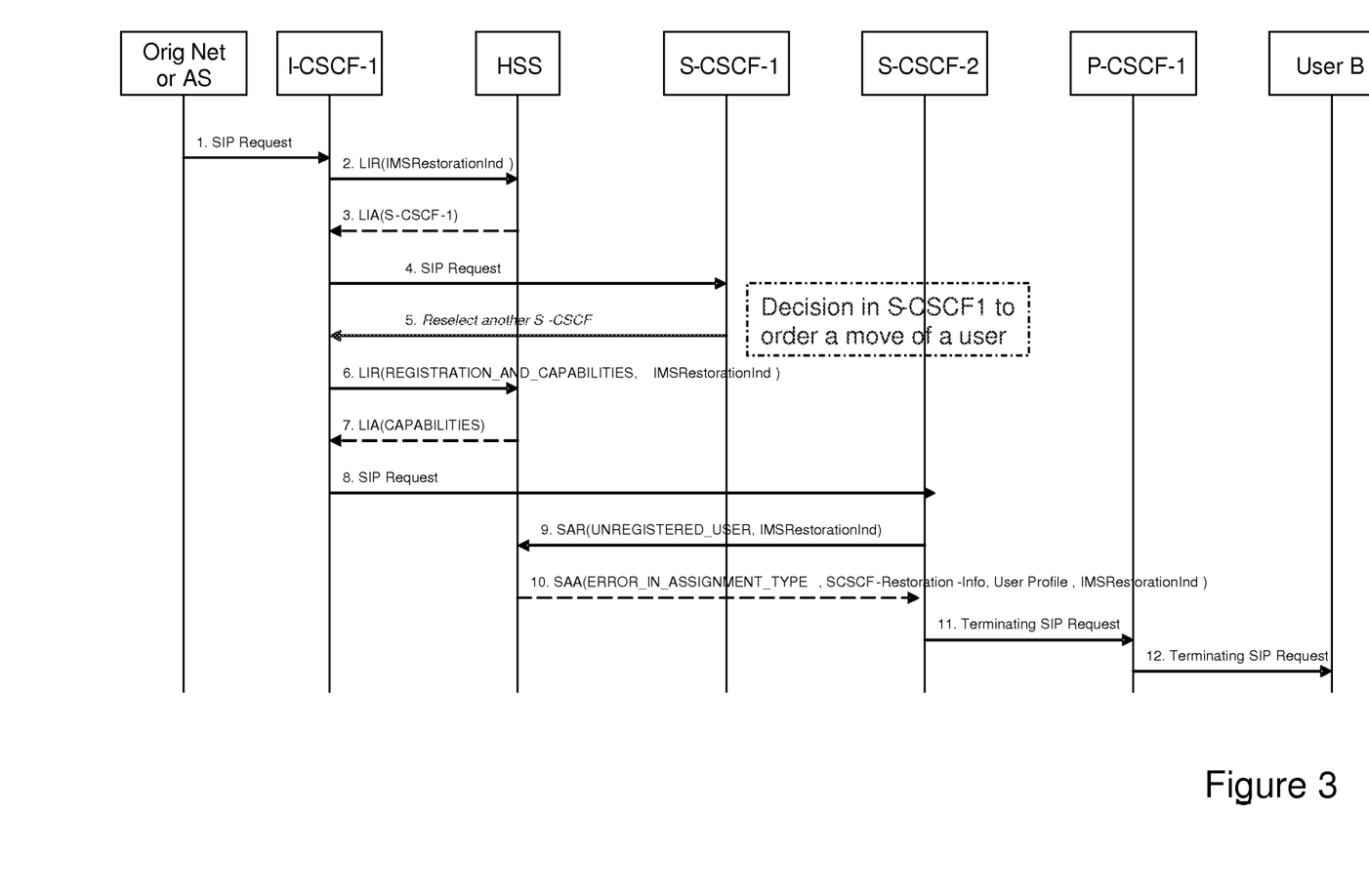
FIG. 3 shows signalling associated with a second procedure for moving an IMS user from a first to a second S-CSCF.
Figure 4:
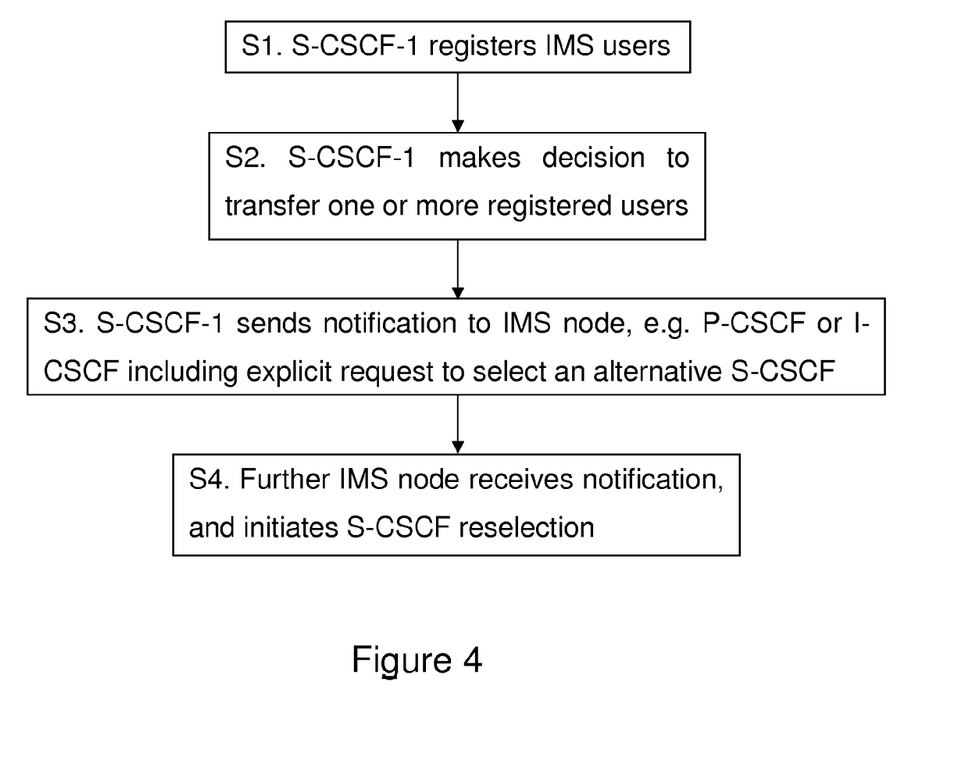
FIG. 4 is a flow diagram illustrating a procedure for moving an IMS user from a first to a second S-CSCF.
Figure 5:
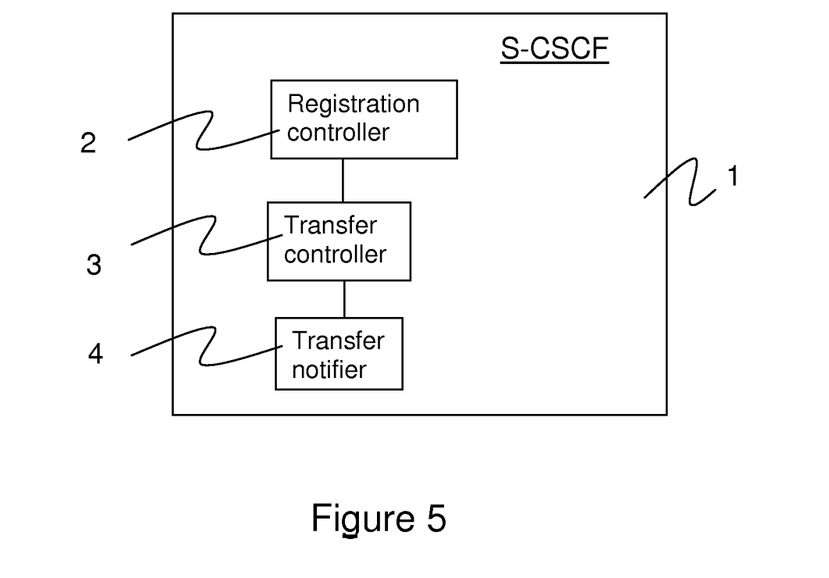
FIG. 5 illustrates schematically an S-CSCF configured to implement a procedure for transferring IMS users to an alternative S-CSCF.
Figure 6:
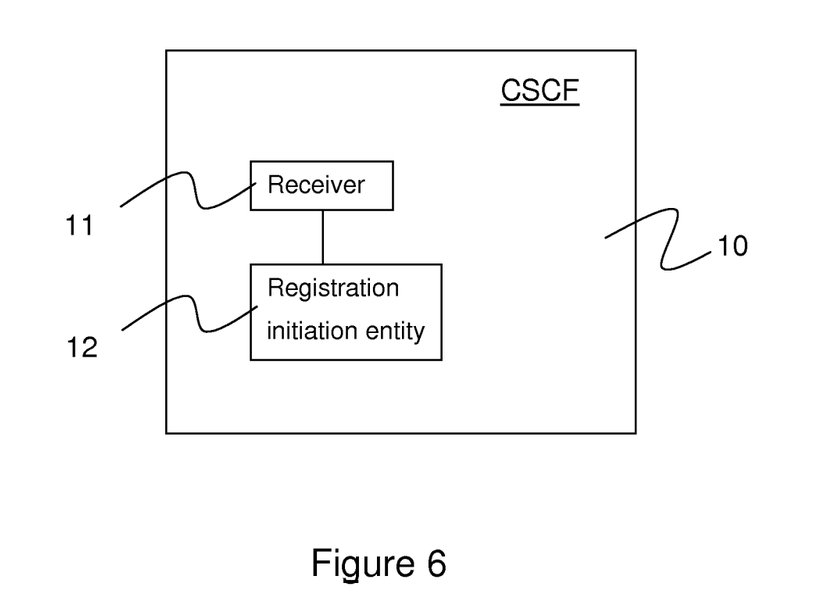
FIG. 6 illustrates schematically a CSCF configured to act upon an instruction received from an S-CSCF currently serving an IMS user to transfer the user to an alternative S-CSCF.

Signalling associated with this third approach is illustrated in FIG. 3. Steps 1 to 4 and 6 to 12 are standard procedures, with the Location-Info-Request (LIR) exchange being triggered by the I-CSCF receiving a non-Register Request from a call originating network or an IMS Application Server (AS). When the currently allocated S-CSCF, that is S-CSCF-1, determines that a user should be moved, it responds to receipt of the non-Register Request (step 4) by sending to the I-CSCF (or AS) a SIP error 504 (Server Timeout) response (step 5) to instruct the peer node to reselect another S-CSCF. The content of the 504 (Server Timeout response) includes the following:

- a Content-Type header field with the value set to associated MIME type of the 3GPP IM CN subsystem XML body as described in sub clause 7.6.4 of 3GPP TS 24.229 v8;
- a P-Asserted-Identity header field set to the value of the SIP URI of the S-CSCF included in the Service-Route header field during the registration of the user whose user agent sent the request causing this response; and
- a 3GPP IM CN subsystem XML body (detailed in sub clause 7.6 of 3GPP TS 24.229 v8):
  - an <ims-3gpp> element with the "version" attribute set to "1" and with an <alternative-service> child element, set to the parameters of the alternative service:
    - a <type> child element, set to "traffic redirection" to indicate that the request should be redirected;
    - a <reason> child element, set to text indicating a reason; and
    - an <action> child element, set to "reselect S-CSCF".

Upon receipt of the 504 response (step 5), the I-CSCF will request the user's capabilities from the HSS, step 6. The user's capabilities are included in the LIA response at step 7. Based on the received capabilities the I-CSCF selects the proper S-CSCF that can support the user's capabilities.

All of the approaches described above will, to a greater or lesser extent, be able to re-distribute the traffic load among the S-CSCFs in the network with little or no service interruption for a user. When an IMS network operator wishes to take an S-CSCF node out of operation, e.g. for maintenance purposes, the node can for example be put into Traffic Reduction state with the desired traffic level to be very low or zero. When an operator would like to rebalance the level of traffic in a network, e.g. due to the introduction or reintroduction of an S-CSCF into the network, it can put one or more (other) S-CSCFs with a higher level of traffic into a Traffic Reduction state with the desired traffic level (e.g. 10% lower than their current levels).

Figure 7:
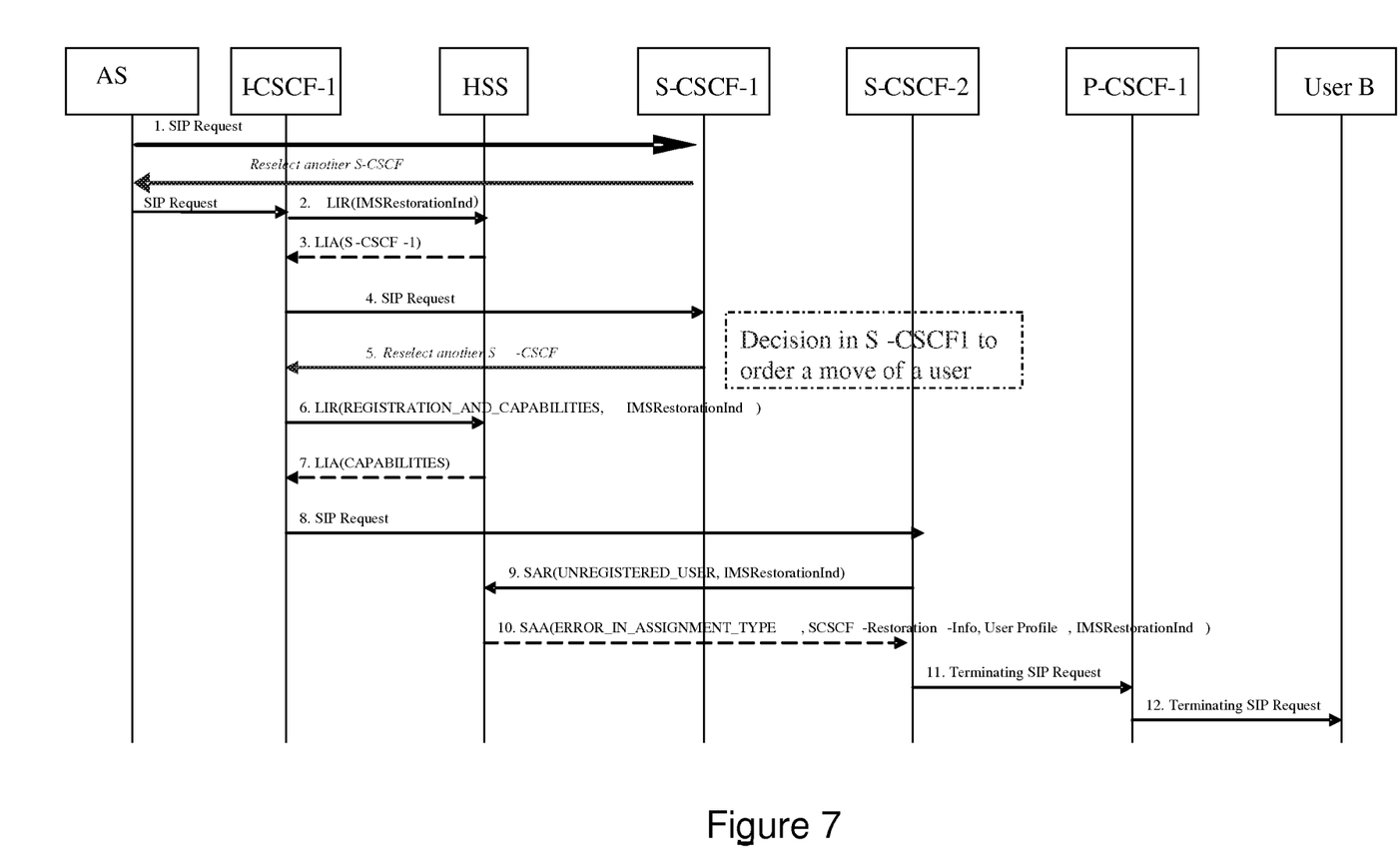
FIG. 7 shows signalling associated with a third procedure for moving an IMS user from a first to a second S-CSCF.

FIG. 7 illustrates an alternative approach to the transfer of a user from a first to a second S-CSCF. In this case, it is an IMS AS that first detects that a transfer is required. When the AS sends a SIP Request to the S-CSCF, the S-CSCF responds to the AS with an explicit instruction to initiate a transfer. The AS does this by sending the SIP Request to the I-CSCF. The I-CSCF follows normal procedures by determining the identity of the current S-CSCF and forwarding the Request to that S-CSCF. The current S-CSCF responds to the I-CSCF with an explicit instruction to transfer the user. The reselection process described above (FIG. 3) are then followed. The AS may be implemented to include a receiver for receiving said notification including an explicit instruction to select an alternative, second S-CSCF, and a response unit for responding to receipt of the explicit instruction by sending a SIP traffic initiation request in respect of said user to an I-CSCF.

It will be appreciated by the person of skill in the art that various modifications may be made to the above described embodiments without departing from the scope of the present invention.

The invention claimed is:

1. A method of handling traffic within an IP Multimedia Subsystem (IMS) network, the method comprising:
   registering an IMS user with a first Serving Call Session Control Function (S-CSCF) of the IMS network;
   the first S-CSCF making a decision or receiving an instruction to transfer said user to an alternative, second S-CSCF within the IMS network;
   as a result of the first S-CSCF making a decision or receiving an instruction to transfer said user to an alternative, second S-CSCF, the first S-CSCF sending to a further IMS node a notification comprising a request to select a second S-CSCF,
   wherein the step of the first S-CSCF sending to the further IMS node the notification to select a second S-CSCF comprises the first S-CSCF sending to a Proxy Call Session Control Function (P-CSCF) the notification to select a second S-CSCF; and
   upon receipt of said notification at the further IMS node, initiating an S-CSCF reselection for the user in order to select a second S-CSCF, wherein
   said notification includes an identification of said first S-CSCF, and
   said S-CSCF reselection for the user comprises including said identification together with an explicit instruction to select an alternative, second S-CSCF in an S-CSCF reselection request sent to an Interrogating Call Session Control Function, I-CSCF, of the IMS network.

2. The method according to claim 1, wherein said notification is a Session Initiation Protocol, SIP, NOTIFY.

3. The method according to claim 1, further comprising the first S-CSCF receiving a SIP SUBSCRIBE transmitted by said P-CSCF to said first S-CSCF in order to subscribe the P-CSCF to event information for said user at the first S-CSCF, wherein
   the first S-CSCF transmits an acknowledgement to the P-CSCF in response to the SIP SUBSCRIBE, and
   in further response to the SIP SUBSCRIBE, the first S-CSCF determines whether to transfer the user to a second S-CSCF.

4. The method according to claim 1, wherein said notification is an unsolicited SIP request.

5. The method according to claim 1, further comprising, following said step of making a decision to transfer said user to an alternative second S-CSCF, sending a non-register request from said further IMS node, receipt of that request causing said first S-CSCF to send said notification to the further IMS node, the instruction being a SIP error message.

6. The method according to claim 5, wherein said SIP error message is a SIP error 504.

7. The method according to claim 1, wherein said step of performing an S-CSCF reselection for the user involves using the IMS Restoration Procedure to install user data into said alternative second S-CSCF.

8. The method according to claim 1, further comprising sending said notification to two or more further IMS nodes.

9. The method according to claim 1, wherein said further IMS node is an IMS Application Server.

10. An apparatus comprising a first Serving Call Session Control Function (S-CSCF) and a Proxy Call Session Control Function (P-CSCF) within an IP Multimedia Subsystem (IMS) network, the apparatus comprising:

a transmitter; and one or more processor coupled to the transmitter, wherein the apparatus is configured to:

register users of the IMS network to allow the provision of IMS services to the registered users;

make a decision or receive an instruction to transfer a registered user to an alternative S-CSCF within the IMS network; and employ the transmitter to send to the P-CSCF a notification comprising an identification of said first S-CSCF a request to select an alternative S-CSCF as a result of making the decision or receiving the instruction to transfer said registered user to an alternative S-CSCF, wherein the P-CSCF is configured such that, in response to receiving the notification, the P-CSCF sends to an Interrogating Call Session Control Function (I-CSCF) of the IMS network an S-CSCF reselection request comprising said identification together with an explicit instruction to select an alternative, second S-CSCF.

11. The apparatus according to claim 10, wherein said apparatus is further configured to employ the transmitter to send said notification as a SIP NOTIFY request.

12. The apparatus according to claim 11, wherein said apparatus is further configured to employ the transmitter to send event information to said further IMS node following receipt of a SIP SUBSCRIBE for said registered user.

13. The apparatus according to claim 10, wherein said apparatus is further configured to employ the transmitter to send said notification as an unsolicited SIP request.

14. The apparatus according to claim 10, wherein said apparatus is further configured to employ the transmitter to send said notification in response to receipt of a non-register request from said further IMS node.

15. The apparatus according to claim 10, wherein said apparatus is further configured to include an identity of the apparatus in the notification.

16. The apparatus according to claim 10, wherein the apparatus is configured to:

employ the transmitter to transmit an acknowledgement to the P-CSCF in response to receiving a SIP SUBSCRIBE transmitted by said P-CSCF to said apparatus, and make a decision whether to transfer the user to the alternative S-CSCF in response to the SIP SUBSCRIBE received from the P-CSCF.

17. An apparatus configured to operate as a Call Session Control Function (CSCF) within an IP Multimedia Subsystem (IMS) network, the apparatus comprising:

a receiver for receiving from a first Serving Call Session Control Function (S-CSCF) with which an IMS user is currently registered, a notification to select an alternative, second S-CSCF, said notification comprising an identification of said first S-CSCF; and a registration initiation entity for sending a registration initiation request to a further IMS node, said request including an explicit instruction to select an alternative second S-CSCF and said identification of said first S-CSCF, wherein said registration initiation entity is configured to include within said registration initiation request, an identification of said first S-CSCF from which said notification is received.

18. The apparatus according to claim 17, wherein the apparatus is configured to operate as one of a Proxy Call Session Control Function, P-CSCF, and an Interrogating Call Session Control Function (I-CSCF).

19. An apparatus configured to operate as an Application Server within an IP Multimedia Subsystem (IMS) network, the apparatus comprising:

a receiver for receiving from a first Serving Call Session Control Function (S-CSCF) with which an IMS user is currently registered an instruction to select an alternative, second S-CSCF; and a response unit for responding to receipt of said instruction by sending a SIP traffic initiation request in respect of said user to an Interrogating Call Session Control Function (I-CSCF), said SIP traffic initiation request for causing the I-CSCF to determine the identify of the first S-CSCF and transmit to the first S-CSCF a further SIP request, wherein the first S-CSCF is configured to respond to the further SIP request by sending to the I-CSCF a request to select another S-CSCF.

* * * * *